(12) United States Patent
Furuishi et al.

(10) Patent No.: US 7,852,790 B2
(45) Date of Patent: Dec. 14, 2010

(54) COMMUNICATION MASTER STATION STARTUP PERIOD CONTROL METHOD

(75) Inventors: Norio Furuishi, Kusatsu (JP); Masanori Fujikawa, Ohtsu (JP)

(73) Assignee: Omron Corporation, Kyoto (JP)

( * ) Notice: Subject to any disclaimer, the term of this patent is extended or adjusted under 35 U.S.C. 154(b) by 1227 days.

(21) Appl. No.: 11/446,590

(22) Filed: Jun. 5, 2006

(65) Prior Publication Data
US 2006/0282506 A1  Dec. 14, 2006

(30) Foreign Application Priority Data
Jun. 9, 2005 (JP) ............................. 2005-169243
May 11, 2006 (JP) ............................. 2006-132469

(51) Int. Cl.
*G06F 13/40* (2006.01)
(52) U.S. Cl. ...................................... 370/257; 710/110
(58) Field of Classification Search ................. 370/216, 370/242, 254; 710/100, 107, 110, 113, 309
See application file for complete search history.

(56) References Cited

U.S. PATENT DOCUMENTS

| 4,484,273 A | * | 11/1984 | Stiffler et al. | ............... | 710/110 |
| 5,367,695 A | * | 11/1994 | Narad et al. | ............... | 709/210 |
| 5,708,962 A | | 1/1998 | MacIntyre et al. | | |
| 5,793,946 A | * | 8/1998 | Gauthier et al. | ............... | 714/25 |
| 5,915,102 A | * | 6/1999 | Chin | ............... | 710/113 |
| 7,000,049 B1 | * | 2/2006 | Heitkamp | ............... | 710/240 |
| 7,206,882 B2 | * | 4/2007 | White et al. | ............... | 710/110 |
| 2006/0040679 A1 | * | 2/2006 | Shikano et al. | ............... | 455/457 |
| 2006/0246947 A1 | * | 11/2006 | Fujii et al. | ............... | 455/557 |

FOREIGN PATENT DOCUMENTS

| EP | 0 357 992 | 3/1990 |
| EP | 1 439 665 | 7/2004 |
| JP | 60-117848 A | 6/1985 |
| JP | 09-128019 | 5/1997 |
| JP | 10-093575 | 4/1998 |
| JP | 2000-059372 | 2/2000 |

* cited by examiner

*Primary Examiner*—William Trost, IV
*Assistant Examiner*—Roberta A Shand
(74) *Attorney, Agent, or Firm*—Foley & Lardner LLP

(57) ABSTRACT

The present invention provides a communication master station startup period control method of being able to securely prevent malfunction of a PLC system, even if at least two communication master stations are connected to the PLC system which permits only one communication master station on the network. After the startup, when it is determined that the communication master stations exist redundantly by a master plurality determination process performed in advance of a link establishment process, the transition to a predetermined master plurality avoidance process is made without making the transition to the link establishment process. Further, when it is determined that the communication master stations exist redundantly by the master plurality determination process performed in parallel with the link establishment process, the transition to the predetermined master plurality avoidance process is made without making the transition to an operation state.

6 Claims, 11 Drawing Sheets

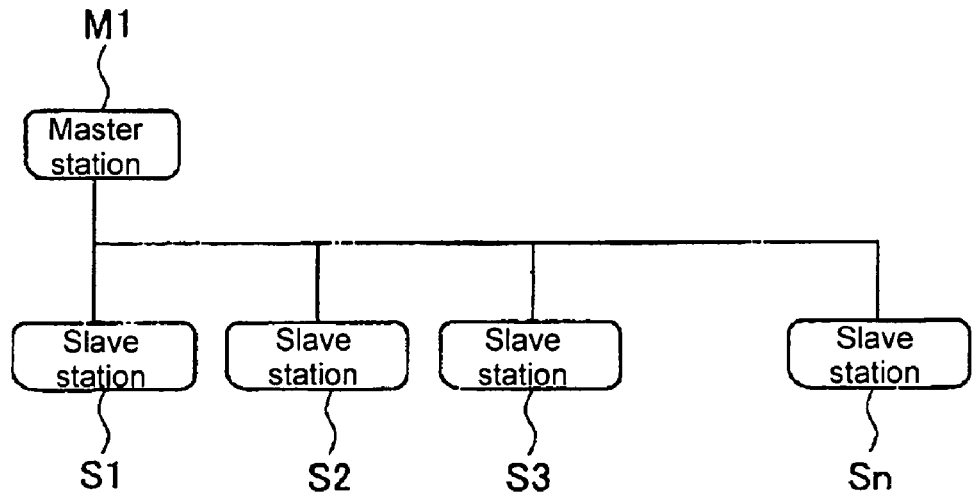
Fig. 11A  Correct connection state
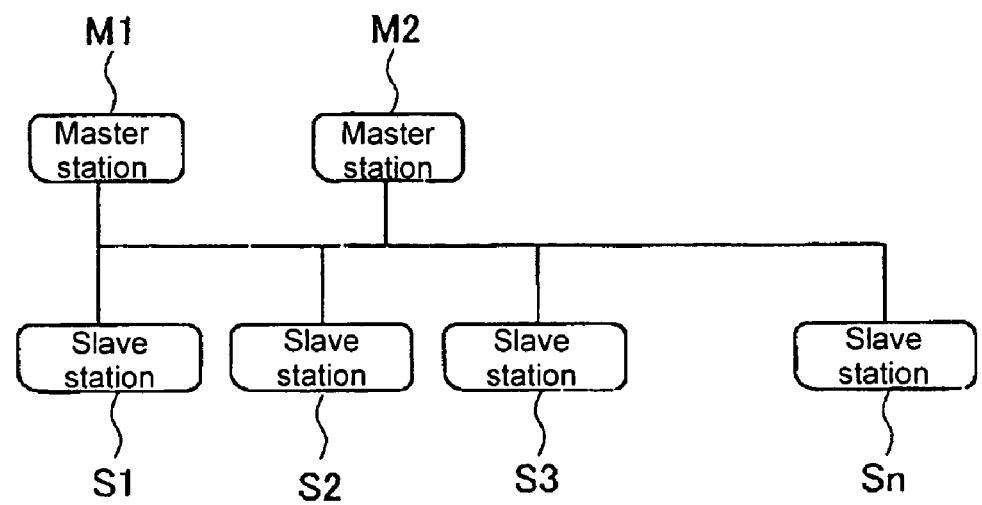
Fig. 11B  Faulty connection state

COMMUNICATION MASTER STATION STARTUP PERIOD CONTROL METHOD

This application claims priority from Japanese patent applications P2005-169243, filed on Jun. 9, 2005 and P2006-132469 filed on May 11, 2006. The entire contents of each of the aforementioned applications are incorporated herein by reference.

BACKGROUND OF THE INVENTION

1. Field of the Invention

The present invention relates to a communication master station startup period control method applied to a PLC system connecting a communication master station and a communication slave station with a bus type network.

2. Description of the Related Art

Conventionally, there is known a PLC system in which various pieces of data are exchanged between the communication master station and each communication slave station (refer to, for example, Japanese Patent Application Laid-Open No. 9-128019). In the PLC system, one programmable logic controller device (PLC device) having a communication facility and one or more I/O terminal devices having the communication facilities are connected with the bus type network, and the PLC device having the communication facility is set to the communication master station while each of the I/O terminal devices having the communication facilities is set to the communication slave station. In an operation state of the PLC device, a series of operations in which a response frame is returned to the communication master station is repeated by delaying timing of each of the corresponding communication slave station for a polling frame broadcast from the communication master station, which allows various pieces of data to be exchanged between the communication master station and each communication slave station. As used herein, "I/O terminal device" shall be a collective term of an input terminal device, an output terminal device, and an input and output terminal device.

There are various implementation modes in "the PLC device having the communication facility" which should be the communication master station. Examples of the implementation mode include the following items: (1) an implementation to which a communication master unit is attached in a building-block type PLC in which various functions can be added in unit, (2) an implementation in which the communication facility is incorporated into a CPU unit in itself in the building-block type PLC in which various functions can be added in unit, (3) an implementation into which the communication facility is further incorporated in an all-in-one type PLC in which all basic functions such as a computation process unit and an input and output unit necessary for PLC are accommodated in one housing, and (4) an implementation to which the communication master unit is externally attached in the all-in-one type PLC in which all the basic functions such as the computation process unit and the input and output unit necessary for PLC are accommodated in one housing. The building-block type PLC includes a type in which each unit is attached to a base board and a type in which units are attached to a DIN rail and the units are connected with a through connector provided in each unit Similarly there are various implementation modes in "the I/O terminal device having the communication facility" which should be the communication slave station. Examples of the implementation mode include the following items: (1) an implementation into which the communication facility is incorporated in an all-in-one type I/O terminal device in which all basic functions such as a terminal stand and an input and output circuit necessary for the I/O terminal device are accommodated in one housing, (2) an implementation to which a communication slave unit is externally attached via cable in the all-in-one type I/O terminal device in which all the basic functions such as the terminal stand and the input and output circuit necessary for the I/O terminal device are accommodated in one housing, and (3) an implementation to which the communication slave unit is attached in a building-block type I/O terminal device in which the basic functions such as the terminal stand and the input and output circuit necessary for the I/O terminal device can be added in unit. In addition, (4) a repeater existing on the network can be included as long as the repeater has a node address.

SUMMARY OF THE INVENTION

A startup period control method of making the transition to an operation state through a link establishment process after the startup is adopted in the communication master station in this kind of PLC system. In the link establishment process, the polling frame is transmitted to each of all the connectable communication slave stations in a collective manner or in each divided slave station group, and a connection frame is confirmed based on presence or absence of the reception of the response frame from the communication slave station. Each communication slave station recognizes a response frame transmission demand to itself based on coincidence between a destination address added to the polling frame and a setting address of itself, and the communication slave station returns the necessary response frame at timing unique to the communication slave station. In another link establishment process, the communication master station specifies one communication slave station in all the connectable communication slave stations to transmit the polling frame, the communication master station confirms the connection frame based on the presence or absence of the reception of the response frame from the communication slave station which receives the polling frame, and the communication master station sequentially makes repetition to all the communication slave stations. In this case, each communication slave station recognizes the response frame transmission demand to itself based on the coincidence between the destination address added to the polling frame and the setting address of itself, and the communication slave station returns the necessary response frame at arbitrary timing of the communication slave station. That is, the communication master station transmits the polling frame to one communication slave station, and the communication master station confirms the connection frame based on the presence or absence of the reception of the response frame from the communication slave station which receives the polling frame. Then, the communication master station transmits the polling frame to another communication slave station, and the communication master station confirms the connection frame based on the presence or absence of the reception of the response frame from the communication slave station which receives the polling frame. The communication master station performs the link establishment process by sequentially making the repetition.

Usually the address of the communication slave station is manually set with a DIP switch or the like in the field. In a large-scale production line typified by an automobile production line and a liquid crystal panel production line, a large number of communication slave stations are required, and about 60 communication slave stations are connected to the one communication master station through the network. Therefore, the plurality of the communication slave station caused by the faulty setting of the address is relatively easy to occur, and there are conventionally proposed various slave plurality countermeasures.

On the other hand, as shown in FIG. 11A, basically only one communication master station (M1) exists on the network while many communication slave stations (S1, S2, . . . Sn) exist on the network (one to N), and the master station address is not manually set in the field. Therefore, there has not been discussed the plurality countermeasure of the communication master station.

However, currently in the large-scale production line typified by the automobile production line and the liquid crystal panel production line, a set-up distance of the network stretches for several tens of meters, and a network cable constituting the network is routed through a plant in a complicated manner, which obscures a correspondence relationship between the communication master station and the network cable. As a result, as shown in FIG. 11B, there is a fear that at least two communication master stations (M1 and M2) exist simultaneously on the same network (hereinafter referred to as "master plurality"), such that the communication master station belonging to one network is mistakenly connected to the network cable of the other network in the two networks physically adjacent to each other in the plant, and such that the additional one communication master station is mistakenly connected to the network cable of the same network due to bad scope in the plant although the communication master station is already connected.

In addition, instead of the conventional PLC system in which only one communication master station is permitted on the network, a PLC system product which permits existence of at least two communication master stations on the network is introduced to a market in recent years. Therefore, a user mistakes the PLC system for the PLC system product which permits the existence of at least two communication master stations on the network, and sometimes there is a possibility that the user intentionally connects at least two communication master stations to the network cable of the network compatible with the PLC system which permits the existence of the only one communication master station.

When the master plurality is generated, the frames from the communication master stations are mixed together or collide with each other on the network. As a result, there is a fear that any one of the communication slave stations becomes inoperable or the unexpected operation is performed in response to the polling frame issued by the communication master station which is determined according to the situation.

In view of the foregoing, an object of the invention is to provide a communication master station startup period control method of being able to securely prevent the malfunction of the PLC system even if at least two communication master stations are connected to the PLC system which permits only one communication master station on the network.

Other and further objects, effects, and advantages of the invention will be easily apparent to those skilled in the art from the following description.

A communication master station startup period control method of the invention is applied to a PLC system in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, a series of operations where a response frame is returned to the communication master station is repeated by delaying timing of each of the corresponding communication slave stations for a polling frame broadcast from the communication master station and thereby various pieces of data are exchanged between the communication master station and each communication slave station. As used herein, the meanings of "broadcast" shall include the case where the frame is transmitted through a normal bus communication line or a multidrop line, and "broadcast" shall also include the case where the frame which is not received by any slave stations except for a particular slave station is transmitted. The meaning of "a response frame is returned to the communication master station is repeated by delaying timing of each of the corresponding communication slave stations" shall include the case where the slave station returns the frame by a general polling selection method and token-passing method. For example, the meaning of "a response frame is returned to the communication master station is repeated by delaying timing of each of the corresponding communication slave stations" shall include the case where the communication master station specifies one of the communication slave stations to transmit the polling frame, the communication slave station which receives the polling frame returns the data, and the communication master station receives the data. The meaning of "a response frame is returned to the communication master station is repeated by delaying timing of each of the corresponding communication slave stations" shall also include the case where one-to-one communication is sequentially repeated between the communication master station and the communication slave stations. The meaning of "a response frame is returned to the communication master station is repeated by delaying the timing of each of the corresponding communication slave stations" shall also include the case where the communication slave stations sequentially transfers a token the communication slave station which obtains the token sequentially transmits the response frame to the communication master station. In the following descriptions, "broadcast" and "a response frame is returned to the communication master station is repeated by delaying timing of each of the corresponding communication slave stations" shall have the same meanings.

More specifically, the communication master station startup period control method of the invention includes performing a master plurality determination process of detecting redundant existence of the communication master stations on a network is performed in advance of the link establishment process and/or in parallel with the link establishment process in a procedure of making transition to the operation state through a link establishment process after startup, making the transition to a predetermined master plurality avoidance process without making the transition to a link establishment process when it is determined that the communication master stations exist redundantly by a master plurality determination process performed in advance of the link establishment process, and making the transition to the predetermined master plurality avoidance process without making the transition to the operation state when it is determined that the communication master stations exist redundantly by the master plurality determination process performed in parallel with the link establishment process.

According to the above configuration, when it is determined that the communication master stations exist redundantly by a master plurality determination process performed in advance of the link establishment process, the transition to a predetermined master plurality avoidance process is made without making the transition to the link establishment process. Further, when it is determined that the communication master stations exist redundantly by the master plurality determination process performed in parallel with the link establishment process, the transition to the predetermined master plurality avoidance process is made without making the transition to the operation state. Therefore, the malfunction of the PLC system can securely be prevented, even if at least two communication master stations are connected to the PLC system which permits only one communication master station on the network.

Further, in the preferred embodiment of the invention, in the master plurality determination process performed in advance of the link establishment process, the master plurality may be determined based on the fact that some sort of a frame is received during a monitoring period sufficiently longer than a broadcast period of the polling frame in the operation state. As used herein, "broadcast" of "broadcast period" has the same meaning as described above. "Broadcast period" shall include the case where the communication master station specifies one of the communication slave stations to transmit the polling frame, the communication slave station which receives the polling frame returns the data, and the communication master station receives the data. "Broadcast period" shall also include the meaning of a communication period during which the one-to-one communication is conducted in the case where the one-to-one communication is sequentially repeated between the communication master station and the communication slave stations. In the following descriptions, "broadcast period" has the same meaning.

According to the above configuration, in the case where the communication master station is mistakenly connected to the network cable which constitutes the network of the currently running PLC system, some sort of a communication frame flowing on the network is received in the monitoring period sufficiently longer than the broadcast period of the polling frame in the operation state by starting up the additionally connected communication master station, which allows the master plurality to be determined.

The polling frame from the communication master station and the corresponding response frame from one or more communication slave stations flow in a LAN cable constituting the network of the currently running PLC system. Therefore, the already existence of another communication master station can be estimated with a high rate of probability by the fact that any one of the frames is received in the monitoring period sufficiently longer than the broadcast period of the polling frame in the operation state, which allows the master plurality to be determined.

In addition, according to the determination method, the master plurality can be determined by detecting the existence of a check code which should be added to all the communication frames. Therefore, the determination algorithm is simplified and the determination method has an advantage that the determination method can instantaneously introduced to the already existing system.

Further, in another preferred embodiment of the invention, in the master plurality determination process performed in advance of the link establishment process, the master plurality may be determined based on the fact that a frame which is transmitted only by the communication master station is received during the monitoring period sufficiently longer than the broadcast period of the polling frame in the operation state.

According to the above configuration, in the case where the communication master station is mistakenly connected to the network cable which constitutes the network of the currently running PLC system, the communication frame which is transmitted only by the communication master station is received in the monitoring period sufficiently longer than the broadcast period of the polling frame in the operation state by starting up the additionally connected communication master station, which allows the master plurality to be determined.

The polling frame from the communication master station flows repeatedly at predetermined transmission intervals in the network cable constituting the network of the currently running PLC system. Therefore, the fact that the communication frame (such as polling frame) transmitted only by the communication master station is received in the monitoring period sufficiently longer than the broadcast period of the polling frame in the operation state directly means that another communication master station already exists (master plurality), which allows the master plurality to be determined.

In the communication frame format, the determination method can be realized by the determination that a code indicating contents of a frame code portion indicating the type of the communication frame corresponds to any one of the already known plural kinds of codes which are transmitted only by the communication master station.

Further, in another preferred embodiment of the invention, in the master plurality determination process performed in advance of the link establishment process, the master plurality may be determined based on the fact that a frame which is transmitted only by the communication slave station is received during the monitoring period sufficiently longer than the broadcast period of the polling frame in the operation state.

According to the above configuration, in the case where the communication master station is mistakenly connected to the network cable which constitutes the network of the currently running PLC system, the communication frame which is transmitted only by the communication slave station is received in the monitoring period sufficiently longer than the broadcast period of the polling frame in the operation state by starting up the additionally connected communication master station, which allows the master plurality to be determined.

The polling frame from the communication master station flows repeatedly at predetermined transmission intervals in the network cable constituting the network of the currently running PLC system, and the corresponding response frame from the communication slave station also flows in the network cable. Therefore, the fact that the communication frame (response frame) transmitted only by the communication slave station is received in the monitoring period sufficiently longer than the broadcast period of the polling frame in the operation state indirectly means that another communication master station already exists (master plurality), which allows the master plurality to be determined.

In addition, according to the determination method, the response frames of the number of connected communication slave stations exist at the maximum in the polling frame period, and it is only necessary to receive one of the response frames. Therefore, in spite of the indirect determination, the determination method has the advantage that the high-reliability determination result is obtained from the viewpoint of determination algorithm.

In the communication frame format, the determination method can be realized by the determination that a code indicating contents of a frame code portion indicating the type of the communication frame corresponds to any one of the already known plural kinds of codes which are transmitted only by the communication slave station.

Further, in another preferred embodiment of the invention, in the master plurality determination process performed in parallel with the link establishment process, the master plurality may be determined based on the fact that the reception of a response frame is not confirmed from any communication slave stations in a connection frame confirmation process for link establishment, the polling frame being transmitted to each of all the connectable communication slave stations to store presence or absence of the reception of the response frame from the communication slave station in the connection frame confirmation process for link establishment.

According to the above configuration, in setting up the new PLC system or in resuming the operation after maintenance, the master plurality can securely be determined in parallel with the link establishment process, even if at least two communication master stations are mistakenly connected to the network cable constituting one network from the beginning, or even if at least two communication master stations are connected from the beginning by mistaking the system for the system which permits at least two communication master stations.

When at least two communication master stations are connected to the network from the startup of the system, there is a high possibility that the communication master stations are simultaneously started up by power-on or reset switch operation. In this case, because the polling frames are transmitted at the substantially same timing from the communication master stations in the link establishment process immediately after the startup, the polling frames become disable by causing the polling frames to collide with each other on the network, and there is the high possibility that the response frame is not transmitted from each communication slave station. Accordingly, the existence of at least two communication master stations (master plurality) can be estimated with a high rate of probability by the fact that the reception of the response frame is not confirmed from any communication slave stations although the polling frame is transmitted to all the connectable communication slave stations, which allows the master plurality to be determined.

In addition, in the determination method, the dedicated polling frame transmission process is not separately provided for the purpose of the master plurality determination, but the polling frame transmission process performed in the link establishment process is commonly used. Therefore, the determination method also has the advantage that a period necessary to make the transition to the operation state from the power-on or reset is not needlessly increased.

Further, in another preferred embodiment of the invention, in the master plurality determination process performed in parallel with the link establishment process, the master plurality may be determined based on the fact that the frame which is transmitted only by the communication master station is received in the connection frame confirmation process for link establishment, the polling frame being transmitted to each of all the connectable communication slave stations to store presence or absence of the reception of the response frame from the communication slave station in the connection frame confirmation process for link establishment.

According to the above configuration, in setting up the new PLC system or in resuming the operation after maintenance, the master plurality can securely be determined in parallel with the link establishment process, even if at least two communication master stations are mistakenly connected to the network cable constituting one network from the beginning, or even if at least two communication master stations are connected from the beginning by mistaking the system for the system which permits at least two communication master stations.

When at least two communication master stations are connected to the network from the startup of the system, there is the high possibility that the communication master stations are simultaneously started up by the power-on or the reset switch operation. However, because the individual communication master units are asynchronously operated, the polling frame transmission timing is slightly delayed from each communication master station, and sometimes the individual communication master station receives the polling frame transmitted from another communication master station. Accordingly, the existence of at least two communication master stations (master plurality) can be estimated with a high rate of probability by the reception of the frame transmitted only by the communication master station, and the master plurality can be determined based on the estimation, in the connection frame confirmation process for link establishment in which the polling frame is transmitted to each of all the connectable communication slave stations to store presence or absence of the reception of the response frame from the communication slave station.

In addition, in the determination method, the dedicated polling frame transmission process is not separately provided for the purpose of the master plurality determination, but the polling frame transmission process performed in the link establishment process is commonly used. Therefore, the determination method also has the advantage that a period necessary to make the transition to the operation state from the power-on or reset is not needlessly increased.

Further, in another preferred embodiment of the invention, in the master plurality determination process performed in parallel with the link establishment process, the master plurality may be determined based on the fact that the frame which is transmitted only by the communication master station is received in the connection frame confirmation process for link establishment, the polling frame being transmitted in each group to store presence or absence of the reception of the response frame from the communication slave station while all the connectable communication slave stations being divided into at least two groups in the connection frame confirmation process for link establishment, and a transmission interval of the polling frame is randomly changed in each group.

According to the above configuration, in setting up the new PLC system or in resuming the operation after maintenance, the master plurality can securely be determined in parallel with the link establishment process, even if at least two communication master stations are mistakenly connected to the network cable constituting one network from the beginning, or even if at least two communication master stations are connected from the beginning by mistaking the system for the system which permits at least two communication master stations.

As described above, when at least two communication master stations are connected to the network from the startup of the system, there is the high possibility that the communication master stations are simultaneously started up by the power-on or the reset switch operation. However, because the communication master units are asynchronously operated, the polling frame transmission timing is slightly delayed from each communication master station, and sometimes one of the communication master stations receives the polling frame transmitted from another communication master station. At this point, when the polling frame transmission interval is randomly changed in each group, collision probability of the polling frames transmitted from at least two communication master stations is decreased to increase probability in which the individual communication master station receives the polling frame from another communication master station. Therefore, the master plurality determination process based on the reception of the frame transmitted only by the communication master station operates more effectively, which allows the master plurality to be determined more securely.

Further, in another preferred embodiment of the invention, the predetermined master plurality avoidance process may be a process of quitting a network. As used herein, "a process of quitting a network" shall include both the case where the connection to the line is physically cut off by a switch and a dormant state where the any frames such as the polling frame are not transmitted while the connection to the line is physically maintained.

According to the above configuration, when it is determined that the communication master stations exist redundantly in advance of the link establishment process after the power on, because disturbance is not imparted to the running PLC system, the running of the PLC system can be continued. On the other hand, when it is determined that the communication master stations exist redundantly during the link establishment process, all the communication master stations are quitted out of the network, so that the risk caused by the transition to the operation state with the master plurality can be avoided.

As described above, the object of the invention is to securely prevent the malfunction of the PLC system even if at least two communication master stations are connected to the PLC system which permits only one communication master station on the network. In addition to "a process of quitting a network," various modes can be adopted as "a predetermined master plurality avoidance process" in consideration of the object.

The following items can be cited as an example of other modes of "a predetermined master plurality avoidance process." That is, (1) when it is determined that the communication master stations exist redundantly before the link establishment process, the additionally connected master plurality communication master station masquerades as the communication slave station without making transition to the link establishment process, and the additionally connected master plurality communication master station transmits the response frame to the original communication master station to notify the original communication master station of the master plurality, and (2) when it is determined that the communication master stations exist redundantly during the link establishment process, the communication master station transmits a predetermined error code to all the communication slave stations at random timing without making the transition to the operation state, and the communication master station stops the operations of all the communication slave stations by the initially arriving error coded.

Another aspect of the invention is a PLC system. In the PLC system, one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, a series of operations where a response frame is returned to the communication master station is repeated by delaying timing of each of the corresponding communication slave stations for a polling frame broadcast from the communication master station and thereby various pieces of data are exchanged between the communication master station and each communication slave station. As used herein, "broadcast" and "a response frame is returned to the communication master station is repeated by delaying timing of each of the corresponding communication slave stations" shall have the same meanings as those described above.

In the PLC system, the communication master station includes a master plurality determination device which detects redundant existence of the communication master stations on a network is performed in advance of the link establishment process and/or in parallel with the link establishment process in a procedure of making transition to the operation state through a link establishment process after startup, a first master plurality avoidance device which makes the transition to a predetermined master plurality avoidance process without making the transition to a link establishment process when it is determined that the communication master stations exist redundantly by a master plurality determination process performed in advance of the link establishment process, and a second master plurality avoidance which makes the transitions to the predetermined master plurality avoidance process without making the transition to the operation state when it is determined that the communication master stations exist redundantly by the master plurality determination process performed in parallel with the link establishment process.

Still another aspect of the invention is a communication master station of a PLC system. The communication master station is applied to a PLC system in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, a series of operations where a response frame is returned to the communication master station is repeated by delaying timing of each of the corresponding communication slave stations for a polling frame broadcast from the communication master station and thereby various pieces of data are exchanged between the communication master station and each communication slave station. As used herein, "broadcast" and "a response frame is returned to the communication master station is repeated by delaying timing of each of the corresponding communication slave stations" shall have the same meanings as those described above.

The communication master station includes a master plurality determination device which detects redundant existence of the communication master stations on a network is performed in advance of the link establishment process and/or in parallel with the link establishment process in a procedure of making transition to the operation state through a link establishment process after startup, a first master plurality avoidance device which makes the transition to a predetermined master plurality avoidance process without making the transition to a link establishment process when it is determined that the communication master stations exist redundantly by a master plurality determination process performed in advance of the link establishment process, and a second master plurality avoidance device which makes the transition to the predetermined master plurality avoidance process without making the transition to the operation state when it is determined that the communication master stations exist redundantly by the master plurality determination process performed in parallel with the link establishment process.

A communication master station startup period control method of the invention is applied to a PLC system in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station. The communication master station startup period control method of the invention includes performing a master plurality determination process of detecting redundant existence of the communication master stations on a network is performed in advance of the link establishment process and/or in parallel with the link establishment process in a procedure of making transition to the operation state through a link establishment process after startup, making the transition to a predetermined master plurality avoidance process without making the transition to a link establishment process when it is determined that the communication master stations exist redundantly by a master plurality determination process performed in advance of the link establishment process, and making the transition to the predetermined master plurality avoidance process without making the transition to the operation state when it is determined that the communication master stations exist redundantly by the master plurality determination process performed in parallel with the link establishment process.

Another aspect of the invention is a PLC system in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station. In the PLC system, the communication master station includes a master plurality determination device which detects redundant existence of the communication master stations on a network is performed in advance of the link establishment process and/or in parallel with the link establishment process in a procedure of making transition to the operation state through a link establishment process after startup, a first master plurality avoidance device which makes the transition to a predetermined master plurality avoidance process without making the transition to a link establishment process when it is determined that the communication master stations exist redundantly by a master plurality determination process performed in advance of the link establishment process, and a second master plurality avoidance which makes the transition to the predetermined master plurality avoidance process without making the transition to the operation state when it is determined that the communication master stations exist redundantly by the master plurality determination process performed in parallel with the link establishment process.

According to the communication master station startup period control method of the invention, the transition to a predetermined master plurality avoidance process is made without making the transition to the link establishment process when it is determined that the communication master stations exist redundantly by a master plurality determination process performed in advance of the link establishment process, and the transition to the predetermined master plurality avoidance process is made without making the transition to the operation state when it is determined that the communication master stations exist redundantly by the master plurality determination process performed in parallel with the link establishment process. Therefore, the malfunction of the PLC system can securely be prevented, even if at least two communication master stations are connected to the PLC system which permits only one communication master station on the network.

BRIEF DESCRIPTION OF THE DRAWINGS

FIGS. 11a and 11B show views explaining a problem in the prior art.

DETAILED DESCRIPTION OF THE PREFERRED EMBODIMENTS

Preferred embodiments of a communication master station startup period control method according to the invention will be described in detail with reference to the accompanying drawings.

Figure 1:
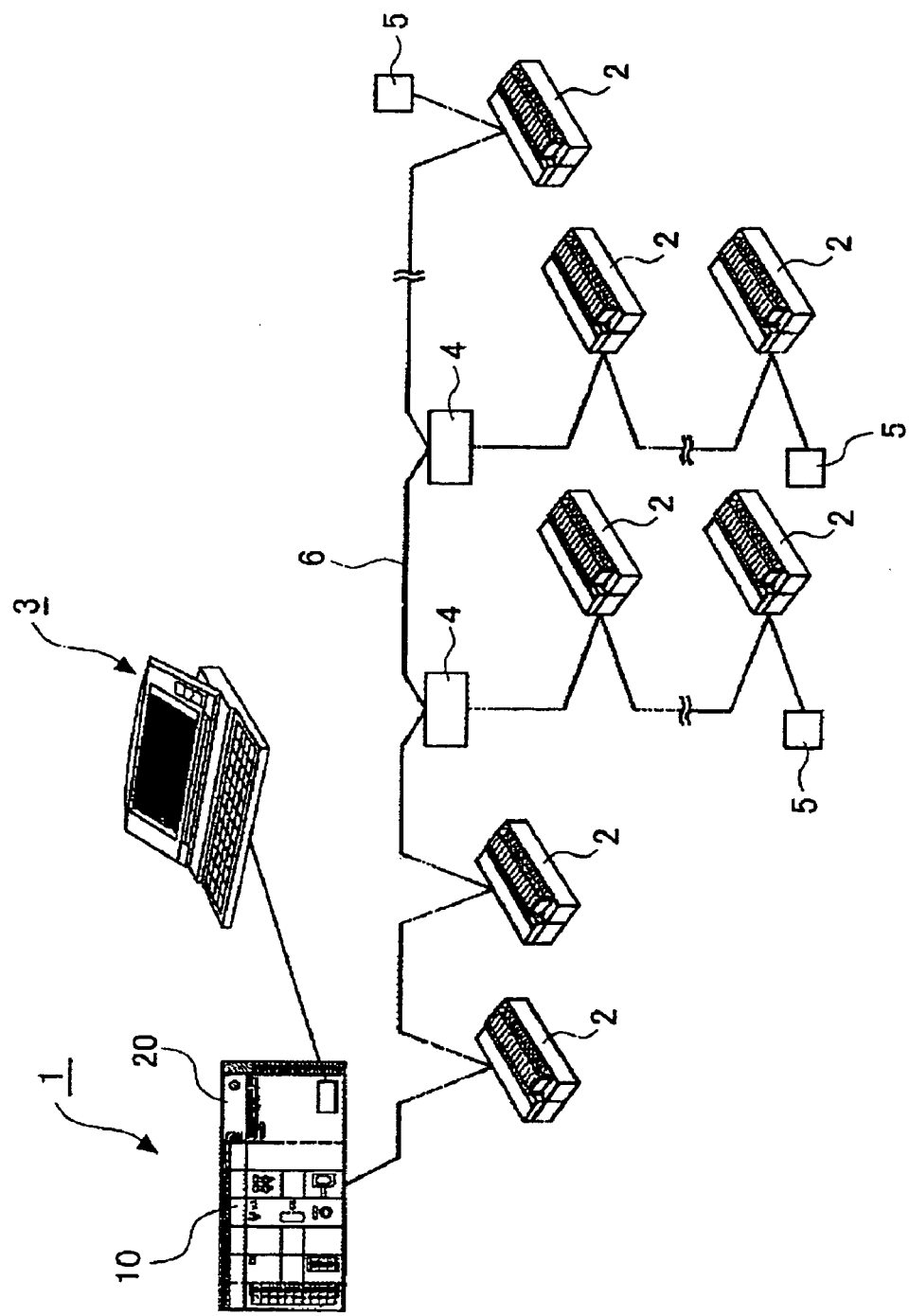
FIG. 1 shows a configuration of a PLC system including a communication master station and a communication slave station.

FIG. 1 shows an entire configuration of a PLC system including a communication master station and a communication slave station. As shown in FIG. 1, the PLC system is configured by connecting a PLC device 1 and plural I/O terminal devices 2, 2 . . . with a fieldbus 6. The PLC device 1 having a communication facility becomes the communication master station. The I/O terminal devices 2 having the communication facilities become the communication slave stations. The fieldbus is bus type network. In FIG. 1, the numeral 4 designates a repeater which functions as a repeater device, and the numeral 5 designates a terminal device which decreases reflection at a terminal of the fieldbus.

A so-called building-block type PLC device is adopted as the PLC device 1. In the building-block type PLC device, many connectors are arranged on a back plane (not shown) in which a parallel bus is placed, and a CPU unit, an I/O unit, and various high-functional units can arbitrarily mounted to the connectors. Particularly, in the embodiment, "the PLC device having the communication facility" is formed by placing the communication master unit to one of connectors on the back plane. In FIG. 1, the reference numerals are given only to a CPU unit 20 and a communication master unit 10 among the units.

Figure 2:
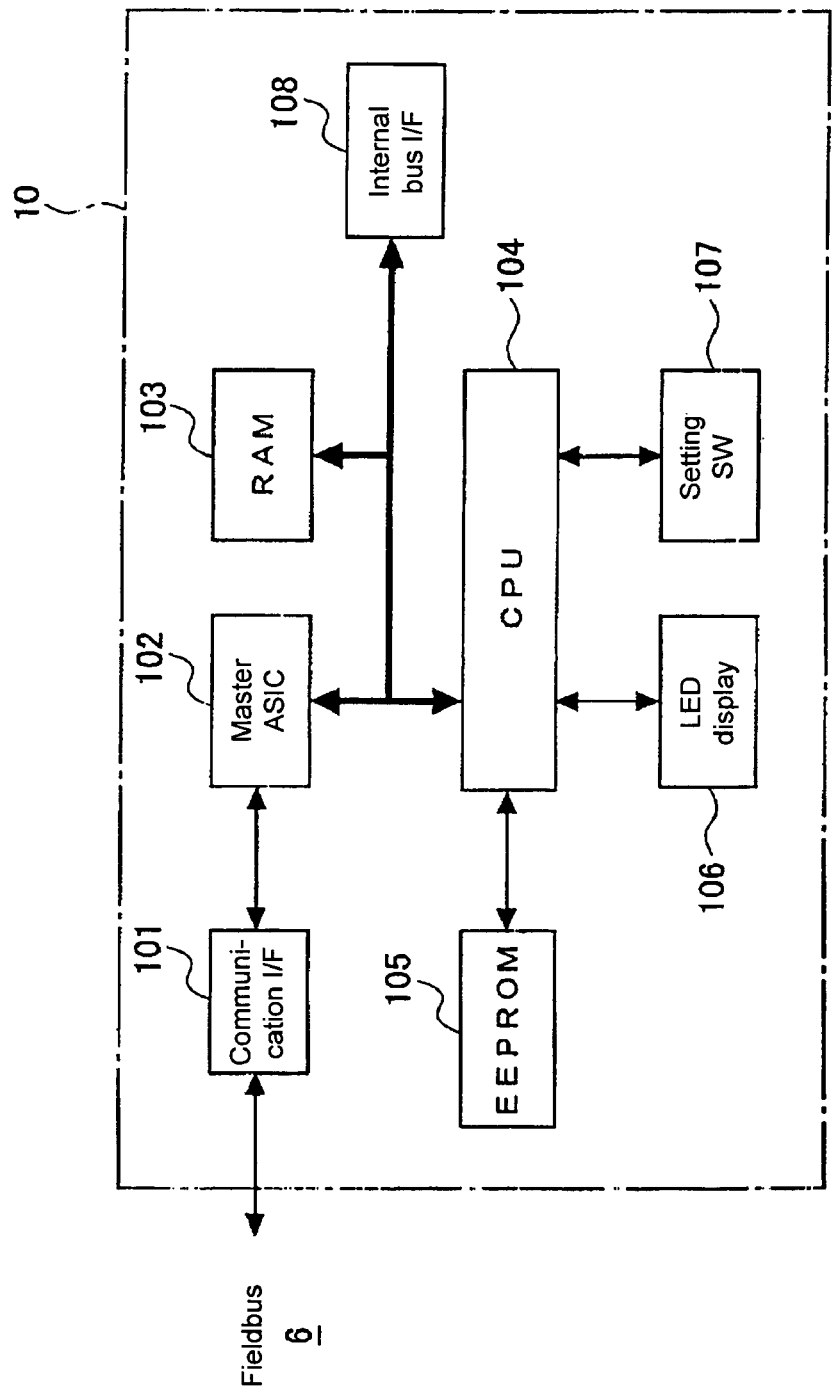
FIG. 2 shows a hardware configuration of a communication master unit.

FIG. 2 shows a hardware configuration of the communication master unit 10. As shown in FIG. 2, the communication master unit 10 includes a communication interface (communication I/F) 101, a master ASIC 102, RAM 103, CPU 104, a non-volatile memory (EEPROM) 105, an LED display 106, a setting switch 107, and an internal bus interface (internal bus I/F) 108. The communication I/F 101 functions as a communication physical layer. The master ASIC 102 is formed by an LSI circuit for realizing the desired communication facility. RAM 103 functions as a buffer area of transmission or reception data which is transmitted and received with CPU unit 20, and RAM 103 also functions as a computation work area of CPU 104. CPU 104 is mainly formed by a Microprocessor, and CPU 104 controls the whole of the communication master unit 10. Various pieces of setting data are stored in the non-volatile memory (EEPROM) 105. The LED display 106 displays various operation displays. The setting switch 107 is used for various setting operations. The internal bus I/F 108 functions as an interface to the internal bus connected to the CPU unit 20.

As is well known in the art, in this kind of PLC system, the CPU unit 20 circularly performs a common process, an I/O refresh process, a user program executing process, a peripheral service process, and the like in a repeated manner. Not only the CPU unit 20 performs the I/O refresh process with a local I/O unit mounted on the back plane, but also the CPU unit 20 performs the I/O refresh process with RAM 103 in the communication master unit 10.

Specifically, OUT data in an I/O memory (not shown) of the CPU unit 20 is written in an OUT area in RAM 103 of the communication master unit 10, and IN data of RAM 103 is written in an IN area in the I/O memory of the CPU unit 20.

On the other hand, as described later in detail, the communication is conducted between the communication master unit 10 and each I/O terminal device 2 through the fieldbus 6 while being asynchronous with the I/O refresh operation of the CPU unit 20. Therefore, a kind of the I/O refresh process is also performed between each I/O terminal device 2 and RAM 103 of the communication master unit 10.

Specifically, the IN data received from the I/O terminal device 2 is written in the IN area in RAM 103 of the communication master unit 10, and the OUT data of the OUT area in RAM 103 is transmitted to the corresponding I/O terminal device 2.

Thus, the I/O refresh process is performed through the communication master unit 10 between the I/O memory in the CPU unit 20 and the I/O terminal devices 2, 2 . . . which allows the CPU unit 20 to handle remotely placed I/O devices which are connected to the I/O terminal devices 2, 2 . . . .

Figure 3:
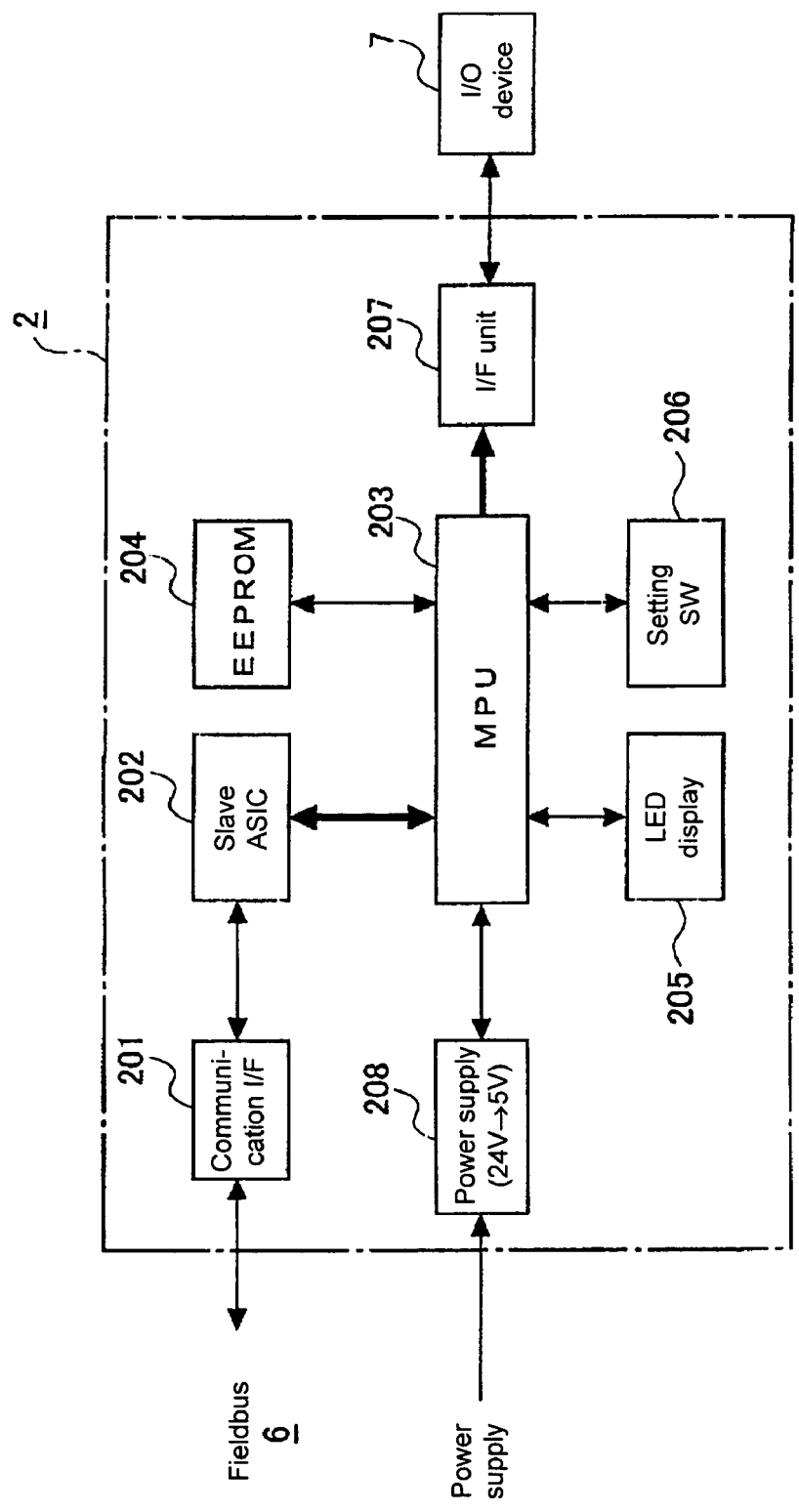
FIG. 3 shows a hardware configuration of an I/O terminal device.

FIG. 3 shows a hardware configuration of the I/O terminal device. As shown in FIG. 3, the I/O terminal device 2 includes a communication interface (communication I/F) 201, a master ASIC 202, CPU 203, a non-volatile memory (EEPROM) 204, an LED display 205, a setting switch 206, an I/F unit 207, and a direct-current power supply unit 208. The communication I/F 201 functions as a communication physical layer. The master ASIC 202 is formed by an LSI circuit for realizing the desired communication facility. CPU 203 is mainly formed by a Microprocessor, and CPU 203 controls the whole of the I/O terminal device 2. Various pieces of setting data are stored in the non-volatile memory (EEPROM) 204. The LED display 205 displays various operation displays. The setting switch 206 is used for various setting operations. The I/F unit 207 transmits and receives data with the I/O device 7. The direct-current power supply unit 208 has a transformation function for supplying stabilized direct current to the whole of the I/O terminal device 2.

As described later in detail, the I/O data is exchanged between the communication master unit 10 and each I/O terminal device 2 through one-to-N master and slave communication. In the one-to-N master and slave communication, the communication master unit 10 is set to the communication master station and each I/O terminal device 2 is set to the communication slave station.

Specifically, the OUT data received from the communication master unit 10 is transmitted to an output device in the I/O device 7 through the I/F unit 207 of the I/O terminal device 2. The IN data captured through the I/F unit 207 into the I/O terminal device 2 from an input device in the I/O device 7 is transmitted to the communication master unit 10. A drive system actuator can be cited as an example of the output device, and a sensor and a switch can be cited as an example of the input device.

The detailed one-to-N master and slave communication including a main part of the invention, conducted by a polling selecting method, will be described with reference to FIGS. 4 to 10.

Figure 4:
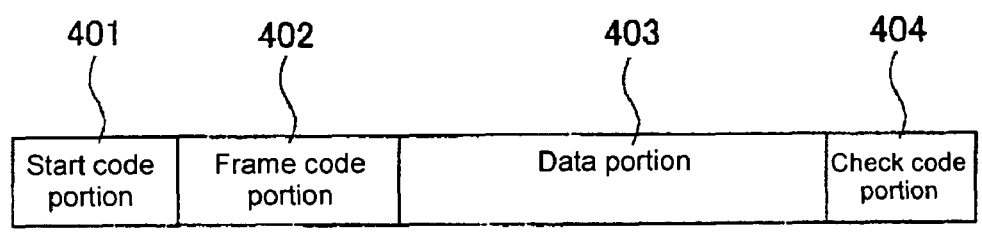
FIG. 4 shows a configuration of a communication frame format.

FIG. 4 shows a configuration of a communication frame format. As shown in FIG. 4, at least a start code portion 401, a frame code portion 402, a data portion 403, and a check code portion 404 are prepared in the communication frame flowing through the fieldbus 6. A start code indicating a head of the frame is stored in the start code portion 401. A frame code for determining the type of the frame is stored in the frame code portion 402. Data and the like are stored in the data portion 403. A check code, such as a CRC code and a parity bit, is stored in the check code portion 404.

Various communication frames flow on the fieldbus 6, and the communication frames includes a frame which can be transmitted only by the communication master station and a frame which can be transmitted only by the communication slave station. The identification between the frames can be performed based on contents of the frame code portion 402.

In the embodiment, four kinds of the frames exist as the frame which can be transmitted only by the communication master station: (1) a network synchronization and output data frame (OUT_Frame) which has three roles of network synchronization, connection confirmation, and output data transmission by simultaneously performing existence confirmation of the communication slave station, the data transmission to the communication slave station, and the data transmission from the communication slave station, (2) a network synchronization frame (TRG_Frame) which has a role of network synchronization, connection confirmation by simultaneously performing the existence confirmation of the communication slave station and data transmission permission from the communication slave station, (3) an output data frame (OUT_NT_Frame) which has a role of output data transmission by performing the data transmission to the communication slave station, and (4) a search frame (BEACON_Frame) which notifies the communication slave station of a current transmission speed.

Two kinds of the frames exist as the frame which can be transmitted only by the communication slave station: (1) an existence response frame (CN_Frame) for performing response to the existence confirmation (OUT_Frame or TRG_Frame) from the communication master station to the communication slave station, and (2) an input data frame (IN_Frame) for performing the data transmission to the master station. The six kinds of the codes are previously determined so as to be able to distinguish one from another, and the pieces of code information are stored in the frame code portion 402. Alternatively, for example, a combination of a station type code indicating the communication master station or the communication slave station and a contents code indicating contents of the frame may be stored in the frame code portion 402.

In the operation state of the PLC system, the series of operations in which the response frame is returned to the communication master station is repeated by delaying the timing of each of the corresponding communication slave stations for the polling frame broadcast from the communication master station, which allows various pieces of data to be exchanged between the communication master station and each communication slave station.

Specifically, when the communication master station broadcasts the polling frame (corresponding to the above-described network synchronization and output data frame (OUT_Frame), network synchronization frame (TRG_Frame), and the like) to the first to fourth frames, the response frame (corresponding to the above-described existence response frame (CN_Frame), input data frame (IN_Frame), and the like) is returned in the order of the first slave station, the second slave station, the third slave station, and the fourth slave station. At this point, for example, a return timing determination method in which a basic idle time is added to the reception timing of the data to itself in the network synchronization and output data frame (OUT_Frame) is well known as the method of determining the return timing of each communication slave station as shown in Japanese Patent Application Laid-Open No. H9-128019.

The destination can be also specified in the broadcasted polling frame. For example, in the embodiment, when the third frame is excluded from the destination address, the third slave station which receives the third frame recognizes that the polling frame is not transmitted to the third slave station, and the third slave station does not return the response frame.

Thus, although the communication master station broadcasts the polling frame to all the communication slave stations, each communication slave station returns the response frame only in the case where the destination specification to each communication slave station exists in the broadcasted polling frame. Therefore, it can safely be said that the data transmission procedure is the polling selection method.

The communication master station startup period control method which is of a pain part of the invention will be described below. As described above, the communication master station startup period control method of the invention includes performing a master plurality determination process of detecting redundant existence of the communication master stations on a network is performed in advance of the link establishment process and/or in parallel with the link establishment process in a procedure of making transition to the operation state through a link establishment process after startup, making the transition to a predetermined master plurality avoidance process without making the transition to a link establishment process when it is determined that the communication master stations exist redundantly by a master plurality determination process performed in advance of the link establishment process, and making the transition to the predetermined master plurality avoidance process without making the transition to the operation state when it is determined that the communication master stations exist redundantly by the master plurality determination process performed in parallel with the link establishment process.

Figure 6:
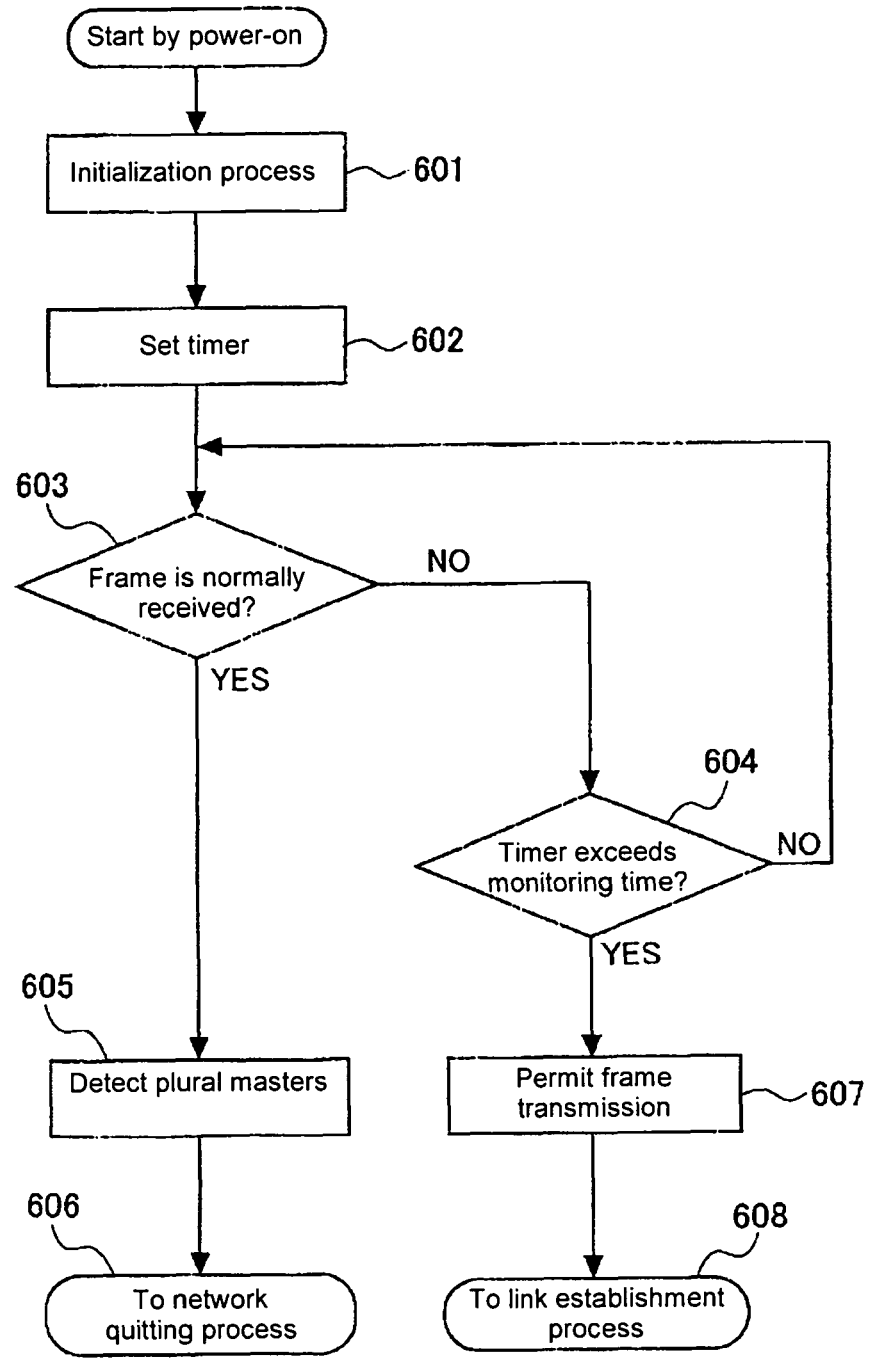
FIG. 6 shows a first flowchart of a process performed in a master station in advance of a link establishment process.

FIG. 6 shows a first flowchart of a process performed in the communication master station in advance of the link establishment process. The process shown in the flowchart of FIG. 6 is performed by CPU 104 in the communication master unit 10 shown in FIG. 2.

Referring to FIG. 6, when the process is started by the power-on, an initialization process is performed (Step 601) to perform initial settings of flags and registers. Then, a timer for determining a monitoring time is set to start to measure the monitoring time (Step 602). At this point, the monitoring time set to the timer is determined sufficiently longer than a transmission period of the polling frame (transmission time interval) in the system operation state.

Then, it is repeatedly determined whether or not some sort of a frame is normally received (NO in Step 603) until the timer exceeds the set monitoring time (NO in Step 604). The determination whether or not some sort of a frame is received can be made by detecting the presence or absence of the check code, such as the CRC code and the parity bit, stored in the check code portion 404 in the frame.

When some sort of a frame is received (YES in Step 603) until the timer exceeds the set monitoring time (NO in Step 604), the master station plurality detection process is performed to set a predetermined master plurality detection flag F1 is set at "1" (Step 605), and the transition to a network quitting process is made to avoid the master plurality (Step 606).

This is because, when the communication master station is connected to the network to which another communication master station is already connected, the polling frame transmitted from the already existing communication master station or the response frame transmitted from each communication slave station in response to the polling frame is received until the timer exceeds the monitoring time.

Alternatively, in the network quitting process, the line connection may physically be cut off through a switch, and the line connection may be put into the dormant state where the any frames such as the polling frame are not transmitted while the connection to the line is physically maintained.

On the contrary, when any frames are not normally received (NO in Step 603) until the timer exceeds the set monitoring time (YES in Step 604), a frame transmission permission process is performed to set a predetermined frame transmission permission flag F2 is set at "1" (Step 607), the transition to the link establishment process is made (Step 608).

This is because, when the communication master station is not connected to the network to which another communication master station is already connected, the polling frame or the response frame is not received until the timer exceeds the monitoring time.

According to the flowchart of FIG. 6, in the case where the communication master station is mistakenly connected to the network cable constituting the network of the already running PLC system, some sort of a communication frame flowing on the network is received during the monitoring period sufficiently longer than the broadcast period of the polling frame in the operation state, when the additionally connected communication master station is powered on. Therefore, the master plurality can be determined to quit the network based on the reception of the communication frame. As used herein, "broadcast period" shall mean the case where the communication master station specifies one communication slave station to transmit the polling frame, the communication slave station which receives the polling frame returns the data, and the communication master station receives the data. In the case where the one-to-one communication is sequentially repeated between the communication master station and the communication slave stations, "broadcast period" shall also include the meaning of the communication period during which the one-to-one communication is conducted. In the following embodiments, "broadcast period" has the same meaning.

According to the process performed in the communication master station, the master plurality can be determined only by detecting the existence of the check code (corresponding to the CRC code, the parity bit, and the like) which should be added to all the communication frames. Therefore, there is the advantage that the determination algorithm is simple and the process can be instantaneously introduced to the system.

Figure 7:
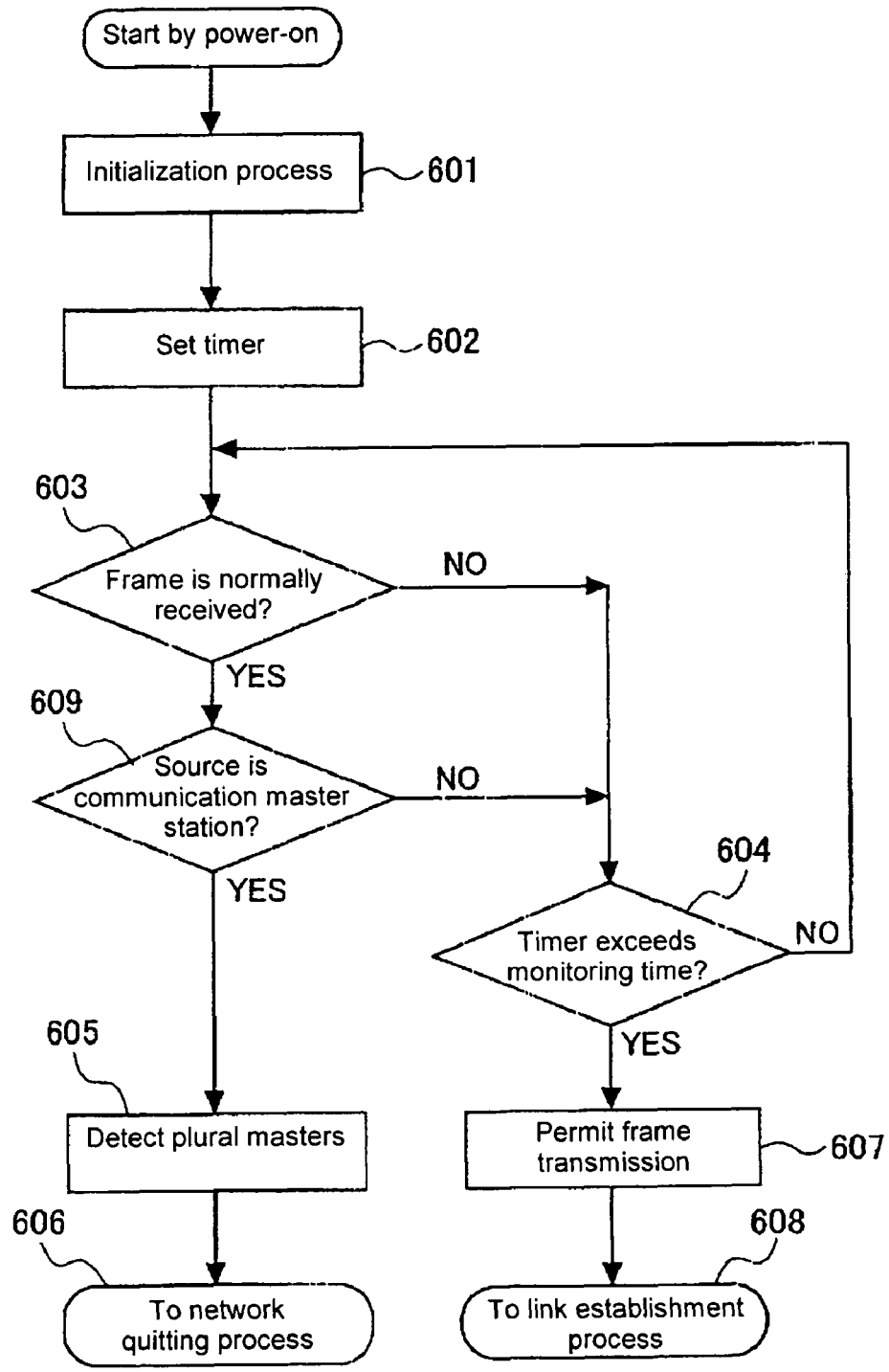
FIG. 7 shows a second flowchart of the process performed in the master station in advance of the link establishment process.

FIG. 7 shows a second flowchart of the process performed in the master station in advance of the link establishment process. The process shown in the flowchart of FIG. 7 is also performed by CPU 104 in the communication master unit 10 shown in FIG. 2.

The flowchart of FIG. 7 differs from the flowchart of FIG. 6 in that a process of determining whether or not the source is the communication master station (Step 609) is newly added between the process of determining whether or not the frame is normally received (Step 603) and the master station plurality detection process (Step 605).

In the flowchart of FIG. 7, even if some sort of a frame is received (YES in Step 603) until the timer exceeds the set monitoring time (NO in Step 604), the transition to the master station plurality detection process (Step 605) is not immediately made, but the determination whether or not the source is the communication master station is made (Step 609). The transition to the master station plurality detection process (Step 605) is made only when it is determined that the source is the communication master station (YES in Step 609). Then, the transition to the network quitting process is made to avoid the master plurality (Step 606) after the predetermined master plurality detection flag F1 is set at "1".

In this case, the determination whether or not the source is the communication master station can be made based on whether or not the code indicating the contents of the frame code portion indicating the type of the communication frame in the communication frame format corresponds to any one of the plural kinds of already known codes transmitted only by the communication master station. The plural kinds of already known codes correspond to the four kinds of the frame: (1) the network synchronization and output data frame (OUT_Frame) for simultaneously performing the existence confirmation of the communication slave station, and the data transmission to the communication slave station, and the data transmission permission from the communication slave station, (2) the network synchronization frame (TRG_Frame) for simultaneously performing the existence confirmation of the communication slave station and the data transmission permission from the communication slave station, (3) the output data frame (OUT_NT_Frame) for performing the data transmission to the communication slave station, and (4) the search frame (BEACON_Frame) for notifying the communication slave station of the current transmission speed. In the case where the code includes both the code to the station kind code indicating which the source is the communication master station or the communication slave station and the content code indicating the contents of the code, the determination whether or not the source is the communication master station can be made from the station kind code of the frame code portion.

Even if the source of the frame received by chance is not the communication master station (the source is the communication slave station) (NO in Step 609), because the monitoring time determined by the timer is set sufficiently longer than the transmission period of the polling frame, the polling frame transmitted from another communication master station is always detected (YES in Step 609) until the timer exceeds the monitoring time (NO in Step 604) as long as the master plurality is generated. Then, the master plurality detection process is performed (Step 605), and the transition to the network quitting process is made (Step 606).

On the contrary, when the master plurality is not generated, the timer exceeds the monitoring time (YES in Step 604) while the polling frame transmitted from the communication master station is not received (NO in Step 609). In this case, the transition to the link establishment process is made (Step 608) through the frame transmission permission process (Step 607).

According to the flowchart of FIG. 7, in the case where the communication master station is mistakenly connected to the network cable constituting the network of the already running PLC system, the communication frame transmitted only by the communication master station is received during the monitoring period sufficiently longer than the broadcast period of the polling frame in the operation state, when the additionally connected communication master station is powered on. Therefore, the master plurality can be determined to quit the network based on the reception of the communication frame transmitted only by the communication master station.

According to the process performed in the communication master station, because the polling frame flows repeatedly at predetermined transmission intervals into the network cable constituting the network of the already running PLC system from the communication master station, the fact that the communication frame (such as polling frame) transmitted only by the communication master station is received in the monitoring period sufficiently longer than the broadcast period of the polling frame in the operation state directly means that another communication master station already exists (master plurality), which allows the master plurality to be determined more securely.

Figure 8:
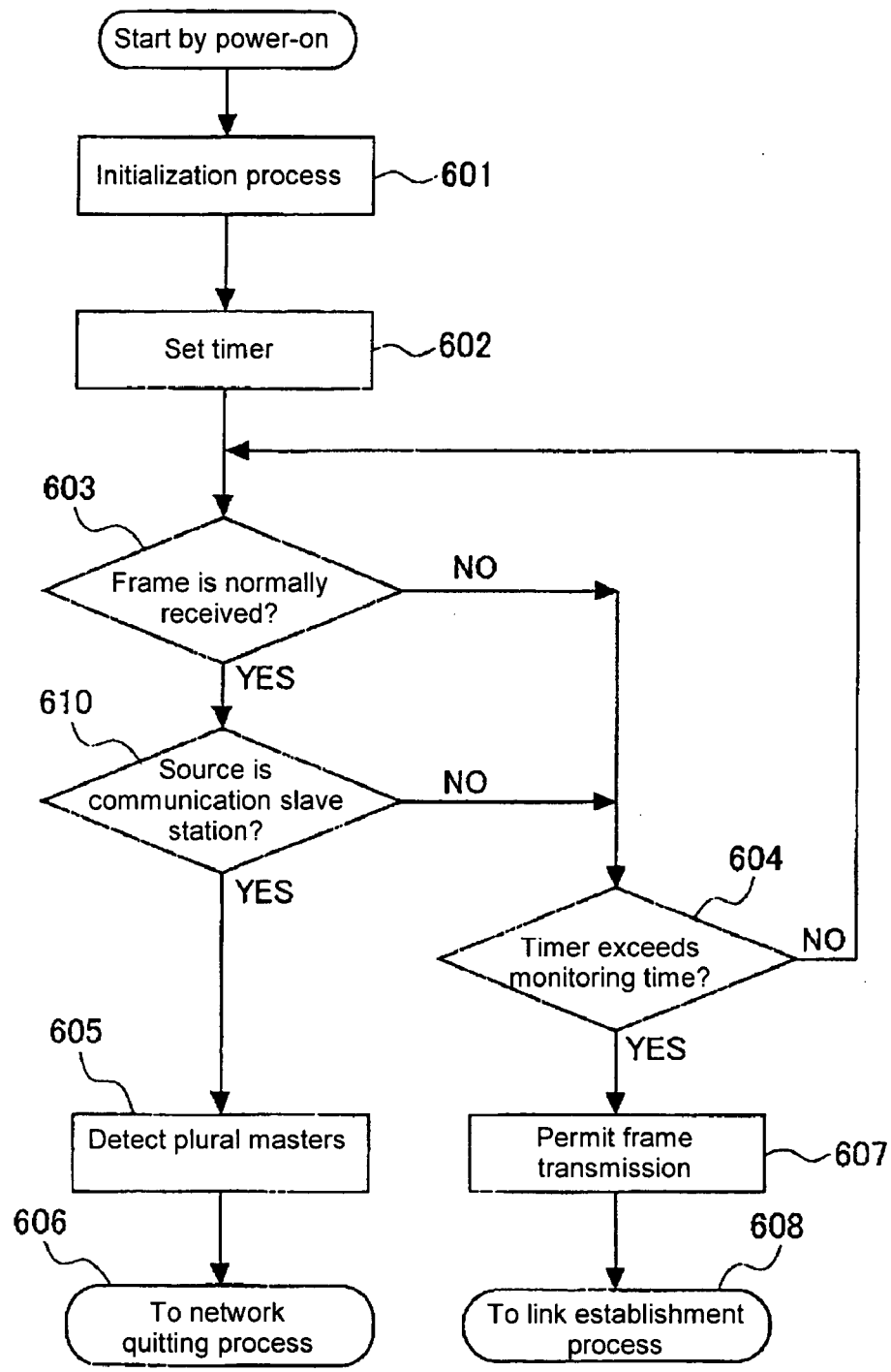
FIG. 8 shows a third flowchart of the process performed in the master station in advance of the link establishment process.

FIG. 8 shows a third flowchart of the process performed in the master station in advance of the link establishment process. The process shown in the flowchart of FIG. 8 is also performed by CPU 104 in the communication master unit 10 shown in FIG. 2.

The flowchart of FIG. 8 differs from the flowchart of FIG. 6 in that a process of determining whether or not the source is the communication slave station (Step 610) is newly added between the process of determining whether or not the frame is normally received (Step 603) and the master station plurality detection process (Step 605).

In the flowchart of FIG. 8, even if some sort of a frame is received (YES in Step 603) until the timer exceeds the set monitoring time (NO in Step 604), the transition to the master station plurality detection process (Step 605) is not immediately made, but the determination whether or not the source is the communication slave station is made (Step 610). The transition to the master station plurality detection process (Step 605) is made only when it is determined that the source is the communication slave station (YES in Step 610). Then, the transition to the network quitting process is made to avoid the master plurality (Step 606) after the predetermined master plurality detection flag F1 is set at "1".

In this case, the determination whether or not the source is the communication slave station can be made based on whether or not the code indicating the contents of the frame code portion indicating the type of the communication frame in the communication frame format corresponds to any one of the plural kinds of already known codes transmitted only by the communication slave station. The plural kinds of already known codes correspond to the two kinds of the frame: (1) the existence response frame (CN_Frame) for performing the response to the existence confirmation (OUT_Frame or TRG_Frame) which the communication master station transmits to the communication slave station, and (2) the input data frame (IN_Frame) for performing the data transmission to the communication master station. In the case where the code includes both the code to the station kind code indicating which the source is the communication master station or the communication slave station and the content code indicating the contents of the code, the determination whether or not the source is the communication slave station can be made from the station kind code of the frame code portion.

Even if the source of the frame received by chance is not the communication slave station (the source is the communication master station) (NO in Step 610), because the monitoring time determined by the timer is set sufficiently longer than the transmission period of the polling frame, the polling frame transmitted from the communication slave station is always detected (YES in Step 610) until the timer exceeds the monitoring time (NO in Step 604) as long as the master plurality is generated. Then, the master plurality detection process is performed (Step 605), and the transition to the network quitting process is made (Step 606).

On the contrary, when the master plurality is not generated, the timer exceeds the monitoring time (YES in Step 604) while the polling frame transmitted from the communication slave station is not received (NO in Step 610). In this case, the transition to the link establishment process is made (Step 608) through the frame transmission permission process (Step 607).

According to the flowchart of FIG. 8, in the case where the communication master station is mistakenly connected to the network cable constituting the network of the already running PLC system, the communication frame transmitted only by the communication slave station is received during the monitoring period sufficiently longer than the broadcast period of the polling frame in the operation state, when the additionally connected communication master station is powered on. Therefore, the master plurality can be determined to quit the network based on the reception of the communication frame transmitted only by the communication slave station.

In addition, according to the process of FIG. 8 performed in the communication master station, the response frames of the number of connected communication slave stations exist at the maximum during the polling frame period, and the determination can be made by receiving only one of the response frames. Therefore, there is also the advantage that high-reliability determination result is obtained from the viewpoint of determination algorithm, although the process of FIG. 8 is the indirect determination.

Figure 5:
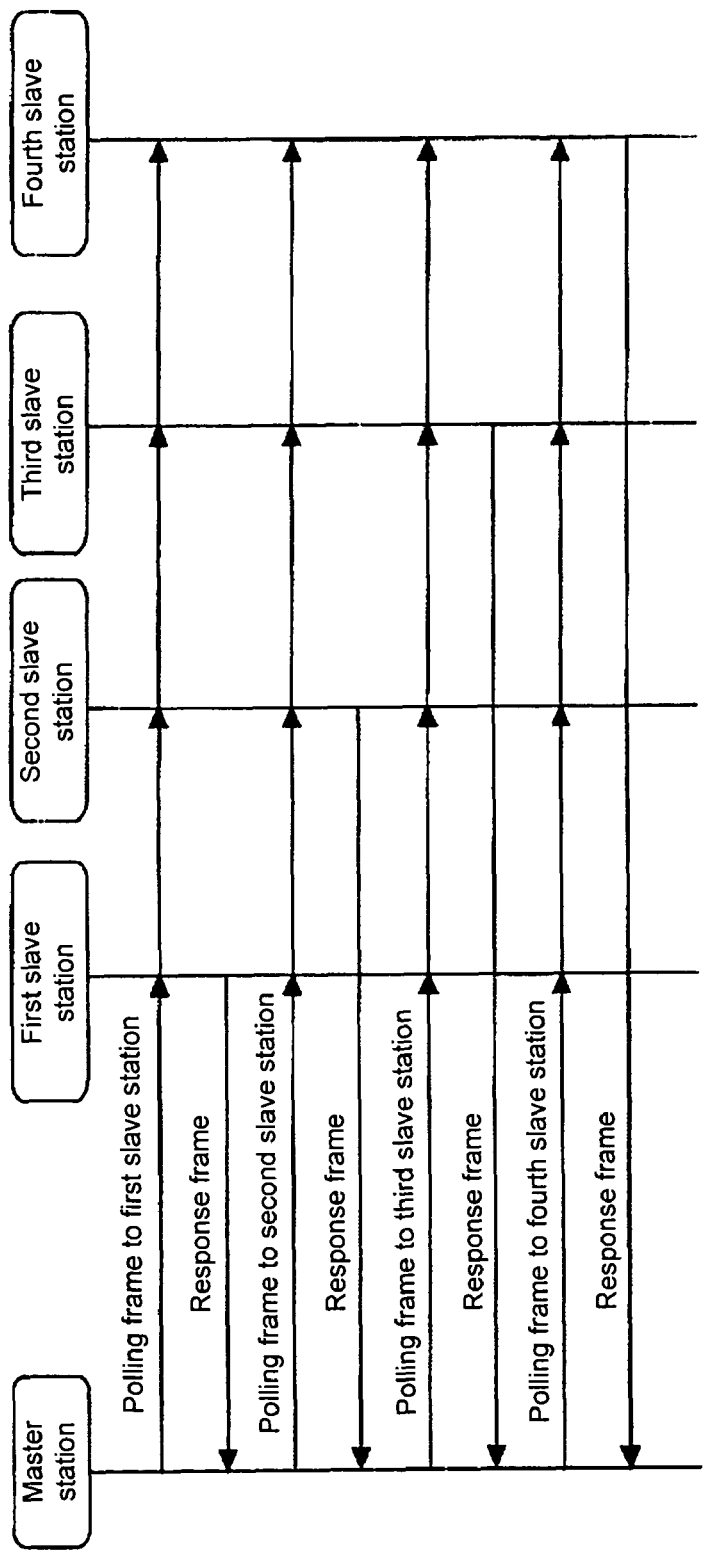
FIG. 5 shows an explanatory view of an example of a basic communication sequence.
Figure 9:
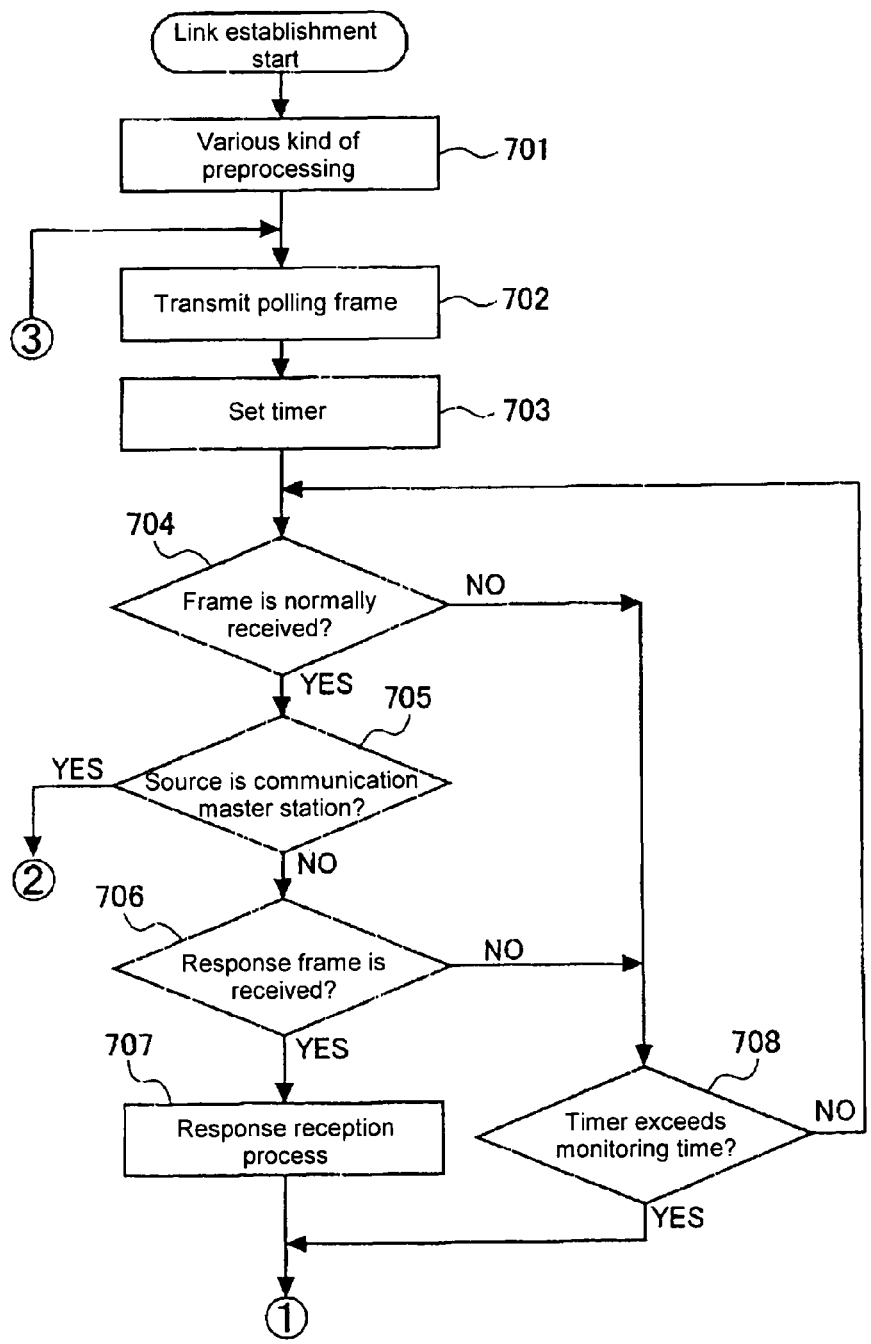
FIG. 9 shows a first-half flowchart of a process performed in the master station during the link establishment process.
Figure 10:
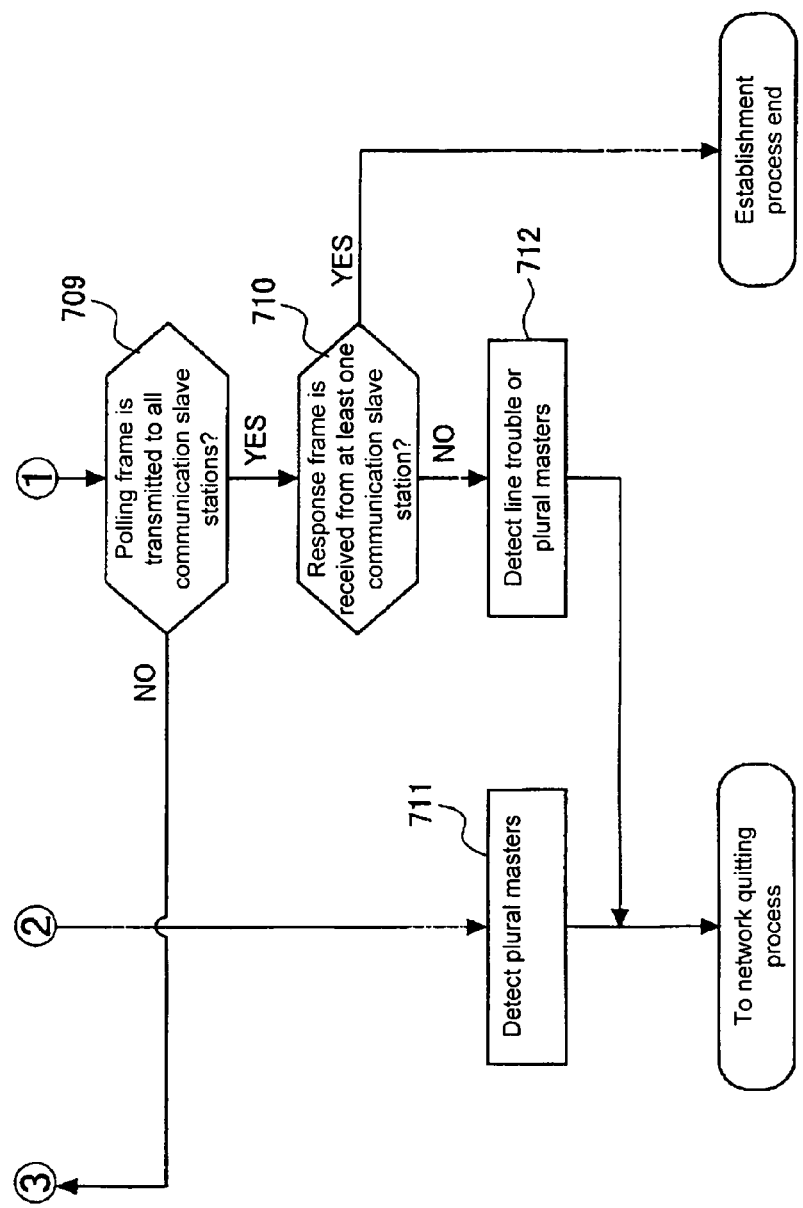
FIG. 10 shows a second-half flowchart of the process performed in the master station during the link establishment process.

FIGS. 9 and 10 show first-half and second-half flowcharts of a process performed in the master station during the link establishment process respectively. As shown in FIG. 5, during the link establishment process, the communication master station performs the master plurality determination process while performing the connection slave confirmation process for link establishment in which the polling frame is transmitted to each of all the connectable communication slave stations to store the presence or absence of the reception of the response frame from the communication slave station.

In FIG. 9, when the link establishment process is started, various kinds of pre-processing necessary for the link establishment process are performed (Step 701), and a polling frame transmission process (Step 702) and a timer setting process of setting the monitoring time (Step 703) are performed.

Then, it is determined whether or not some sort of a frame is normally received (NO in Step 704) until the timer exceeds the monitoring time (NO in Step 708). At this point, the determination whether or not some sort of a frame is received can be made by detecting the presence or absence of the check code, such as the CRC code and the parity bit, stored in the check code portion 404 in the frame.

A function of transmitting the response frame by delaying the timing of each of the communication slave stations while being able to specify the destination is incorporated into the polling frame broadcasted by the polling frame transmission process (Step 702). Therefore, there are plural methods of performing the polling for the connection slave confirmation process.

When the four communication slave stations exist for the one communication master station, the following cases can be assumed: (1) the case where the polling is performed to all the communication slave stations by broadcasting the one polling frame to the first slave station to the fourth slave station while all the destinations are specified, (2) the case where the polling is performed to all the communication slave stations by respectively broadcasting the two polling frames to the group including the first and second slave stations and the group including the third and fourth slave stations while the two polling frames are divided into two times, the destinations of the two polling frames being specified to the groups respectively, (3) the case where the polling is performed to all the communication slave stations by broadcasting the four polling frames respectively specifying the communication slave stations which are of the polling target while the four polling frames are divided into four times. The embodiment of the communication sequence described with reference to FIG. 5 corresponds to the case of (3). As can be seen from FIG. 5, the communication master station specifies one communication slave station to transmit the polling frame, and the communication master station confirms the connection frame based on the presence or absence of the reception of the response frame from the communication slave station which receives the polling frame. Then, the communication master station transmits the polling frame to another communication slave station, and the communication master station confirms the connection frame based on the presence or absence of the reception of the response frame from the communication slave station which receives the polling frame. The communication master station performs the link establishment process by sequentially making the repetition to all the communication slave stations. As used herein, the meaning of the broadcast shall include the case where the frame which is not received by any slave stations except for a particular slave station is transmitted. The meaning of the broadcast shall also include the case where the frame is transmitted through the normal bus communication line or the multidrop line.

For the purpose of convenience, in the flowchart of FIG. 9, it is assumed that the polling frame transmission process (Step 703) is performed along the case of (3) as shown in FIG. 5.

The polling frame transmission process is performed on the above assumption to transmit the polling frame whose destination is specified to the first slave station (Step 702). When the master plurality is not generated, the response frame is received from the first slave station (YES in Step 704, NO in Step 705, and YES in Step 706) before the timer exceeds the monitoring time (NO in Step 708), a response reception process is performed (Step 707), and a connection confirmation flag F11 is set at "1" to the first slave station.

From the second slave station to the fourth slave station (NO in Step 701 in FIG. 10), the polling frame transmission process is repeated while the destination is changed (Step 702). In the flowchart of FIG. 9, because all the second to fourth slave stations are connected, the response reception process is performed in each time (Step 707), and connection confirmation flags F12, F13, and F14 are sequentially set at "1" to the second to fourth slave stations.

When any one of the first to fourth slave stations is not connected, the timer exceeds the monitoring time during waiting for receiving the response frame corresponding to the communication slave station (YES in Step 708), so that a connection confirmation flag F1$n$ for nth communication slave station is maintained at "0".

When the polling frame transmission is completed to all the communication slave stations (YES in Step 709), it is determined whether or not the response frame is received from at least one communication slave station based on the contents of the connection confirmation flags F11 to F14 (Step 710). When the response frame is received from at least one communication slave station (YES in Step 710), the link establishment process is ended to make the transition to the operation state.

In the operation state, as described above, the series of operations in which the response frame is returned to the communication master station is repeated by delaying the timing of each of the corresponding communication slave station for the polling frame broadcast from the communication master station, which allows various pieces of data to be exchanged between the communication master station and each communication slave station. The exchange of various pieces of data between the communication master station and each communication slave station may be performed by the general polling selection method or token-passing method. For example, the data exchange may includes the sequential one-to-one communication between the communication master station and each communication slave station, where the communication master station specifies one communication slave station to transmit the polling frame, the communication slave station which receives the polling frame returns the data, and the communication master station receives the data. The data exchange may include the case where the communication slave station sequentially transfers the token and the communication slave station which obtains the token sequentially transmits the response frame to the communication master station. The meaning of "the response frame is returned to the communication master station is returned to the communication master station by delaying the timing of each of the communication slave stations" shall also include the above methods.

The master plurality determination process for master plurality avoidance performed in parallel with the link establishment process will be described below.

In the setup of the new PLC system, or in resuming the running after the maintenance, it is assumed that at least two communication master stations are mistakenly connected to the network cable constituting one network from the beginning or at least two communication master stations are connected from the beginning by mistaking the system for the system which permits at least two communication master stations.

When at least two communication master stations are connected to the network from the startup of the system, there is a high possibility that the communication master stations are simultaneously started up by the power-on or reset switch operation. In this case, because the polling frames are transmitted at the substantially same timing from the communication master stations in the link establishment process immediately after the startup, the polling frames become disable by causing the polling frames to collide with each other on the network, and there is the high possibility that the response frame is not transmitted from each communication slave station. Accordingly, the existence of at least two communication master stations (master plurality) can be estimated with a high rate of probability by the fact that the reception of the response frame is not confirmed from any communication slave stations although the polling frame is transmitted to all the connectable communication slave stations, which allows the master plurality to be determined.

In the flowcharts of FIGS. 9 and 10, when it is determined that the response frame is not received from any communication slave stations (NO in Step 710) although the polling frame is transmitted to all the communication slave stations (YES in Step 709), a process of detecting a line trouble or the master plurality is performed (Step 712), a predetermined flag F3 indicating the detection of the line trouble or the master plurality is set at "1", and the transition to the network quit process is made (first process).

According to the above configuration, in the setup of the new PLC system or in resuming the operation after maintenance, even if at least two communication master stations are mistakenly connected to the network cable constituting one network from the beginning, or even if at least two communication master stations are connected from the beginning by mistaking the system for the system which permits at least two communication master stations, the master plurality can securely be determined in parallel with the link establishment process, and all the redundant communication master stations can spontaneously be quited out of the line to prevent the occurrence of the malfunction of the PLC system caused by the master plurality.

On the other hand, when at least two communication master stations are connected to the network from the startup of the system, there is the high possibility that the communication master stations are simultaneously started up by the power-on or the reset switch operation. However, because the individual communication master units are asynchronously operated, the polling frame transmission timing is slightly delayed from each communication master station, and sometimes the individual communication master station receives the polling frame transmitted from another communication master station. Accordingly, the existence of at least two communication master stations (master plurality) can be estimated with a high rate of probability by the reception of the frame transmitted only by the communication master station, and the master plurality can be determined based on the estimation, in the connection frame confirmation process for link establishment in which the polling frame is transmitted to each of all the connectable communication slave stations to store the presence or absence of the reception of the response frame from the communication slave station.

In the flowcharts of FIGS. 9 and 10, when it is determined that the response frame is received from any one of the communication slave stations during waiting for receiving the response frame from any one of the communication slave stations (YES in Step 705), a master station plurality detection process is performed (Step 711), a flag F4 indicating the master station plurality detection is set at "1", and the transition to the network quitting process is made (second process).

According to the above configuration, in the setup of the new PLC system or in resuming the operation after maintenance, even if at least two communication master stations are mistakenly connected to the network cable constituting one network from the beginning, or even if at least two communication master stations are connected from the beginning by mistaking the system for the system which permits at least two communication master stations, the master plurality can securely be determined in parallel with the link establishment process, and all the redundant communication master stations can spontaneously be quitted out of the line to prevent the occurrence of the malfunction of the PLC system caused by the master plurality.

In addition, according to the first process and the second process, the dedicated polling frame transmission process is not separately provided for the purpose of the master plurality determination, but the polling frame transmission process performed in the link establishment process is commonly used. Therefore, the first process and the second process also have the advantage that the period necessary to make the transition to the operation state from the power-on or reset is not needlessly increased.

In the second process, one of the communication master stations detects the reception of the polling frame performed by the other communication master station by utilizing the accidental difference in transmission timing between the polling frames transmitted from the two redundant communication master stations. Alternatively, when the polling frame transmission periods in the link establishment process are previously caused to differ from one another in each communication master station, or when the monitoring time data set in the timer is set to a random value using a random number generator in the timer setting process (Step 703), the transmission timing of the polling frame transmitted from each of the two redundant communication master stations can aggressively be delayed. Therefore, the possibility of the polling frame reception can be increased in the master plurality to enhance the reliability of the master plurality determination.

That is, when the above configuration is adopted, the collision probability of the polling frames transmitted from at least two communication master stations is decreased to increase the probability in which the individual communication master station receives the polling frame from another communication master station. Therefore, the master plurality determination process based on the reception of the frame transmitted only by the communication master station operates more effectively, which allows the master plurality to be determined more securely.

According to the invention, the transition to a predetermined master plurality avoidance process is made without making the transition to the link establishment process when it is determined that the communication master stations exist redundantly by a master plurality determination process performed in advance of the link establishment process, and the transition to the predetermined master plurality avoidance process is made without making the transition to the operation state when it is determined that the communication master stations exist redundantly by the master plurality determination process performed in parallel with the link establishment process. Therefore, the malfunction of the PLC system can securely be prevented, even if at least two communication master stations are connected to the PLC system which permits only one communication master station on the network.

What is claimed is:

1. A communication master station applied to a PLC system, in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station, the communication master station comprising:

a master plurality determination part which detects existence of plural communication master stations on the network is performed in advance of a link establishment process and/or in parallel with the link establishment process in a procedure of making transition to the operation state through the link establishment process after startup;

a first master plurality avoidance part which makes a transition to a predetermined master plurality avoidance process without making the transition to the link establishment process when it is determined that plural communication master stations exist by a master plurality determination process performed in advance of the link establishment process; and a second master plurality avoidance part which makes the transition to the predetermined master plurality avoidance process without making the transition to the operation state when it is determined that plural communication master stations exist by the master plurality determination process performed in parallel with the link establishment process, wherein, in the master plurality determination process perfoii ied in parallel with the link establishment process, the master plurality is determined based on a fact that a reception of a response frame is not confirmed from any communication slave stations in a connection frame confirmation process for the link establishment, a polling frame being transmitted to each of all the connectable communication slave stations to store presence or absence of the reception of the response frame from the communication slave station in the connection frame confirmation process for link establishment.

2. A communication master station startup period control method applied to a PLC system, in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station, the communication master station startup period control method comprising:

performing a master plurality determination process of detecting existence of plural communication master stations on the network is performed in advance of a link establishment process and/or in parallel with the link establishment process in a procedure of making a transition to the operation state through the link establishment process after startup;

making the transition to a predetermined master plurality avoidance process without making the transition to the link establishment process when it is determined that the communication master stations exist redundantly by the master plurality determination process performed in advance of the link establishment process; and making the transition to the predetermined master plurality avoidance process without making the transition to the operation state when it is determined that plural communication master stations exist by the master plurality determination process performed in parallel with the link establishment process, wherein, in the master plurality determination process performed in parallel with the link establishment process, the master plurality is determined based on a fact that a reception of a response frame is not confirmed from any communication slave stations in a connection frame confirmation process for the link establishment, a polling frame being transmitted to each of all the connectable communication slave stations to store presence or absence of the reception of the response frame from the communication slave station in the connection frame confirmation process for link establishment.

3. A PLC system in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station, wherein the communication master station comprising:
    a master plurality determination part which detects existence of plural communication master stations on the network is performed in advance of a link establishment process and/or in parallel with the link establishment process in a procedure of making transition to the operation state through the link establishment process after startup;
    a first master plurality avoidance part which makes a transition to a predetermined master plurality avoidance process without making the transition to the link establishment process when it is determined that plural communication master stations exist by the master plurality determination process performed in advance of the link establishment process; and
    a second master plurality avoidance part which makes the transition to the predetermined master plurality avoidance process without making the transition to the operation state when it is determined that plural communication master stations exist by the master plurality determination process performed in parallel with the link establishment process,
wherein, in the master plurality determination process performed in parallel with the link establishment process, the master plurality is determined based on a fact that a reception of a response frame is not confirmed from any communication slave stations in a connection frame confirmation process for the link establishment, a polling frame being transmitted to each of all the connectable communication slave stations to store presence or absence of the reception of the response frame from the communication slave station in the connection frame confirmation process for link establishment.

4. A communication master station applied to a PLC system, in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station, the communication master station comprising:
    a master plurality determination part which detects existence of plural communication master stations on the network is performed in advance of a link establishment process and/or in parallel with the link establishment process in a procedure of making transition to the operation state through the link establishment process after startup;
    a first master plurality avoidance part which makes a transition to a predetermined master plurality avoidance process without making the transition to the link establishment process when it is determined that plural communication master stations exist by a master plurality determination process performed in advance of the link establishment process; and
    a second master plurality avoidance part which makes the transition to the predetermined master plurality avoidance process without making the transition to the operation state when it is determined that plural communication master stations exist by the master plurality determination process performed in parallel with the link establishment process,
wherein, in the master plurality determination process performed in advance of the link establishment process, the master plurality is determined based on a fact that a frame is received during a monitoring period longer than a broadcast period of the polling frame in the operation state.

5. A communication master station startup period control method applied to a PLC system, in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station, the communication master station startup period control method comprising:
    performing a master plurality determination process of detecting existence of plural communication master stations on the network is performed in advance of a link establishment process and/or in parallel with the link establishment process in a procedure of making a transition to the operation state through the link establishment process after startup;

making the transition to a predetermined master plurality avoidance process without making the transition to the link establishment process when it is determined that the communication master stations exist redundantly by the master plurality determination process performed in advance of the link establishment process; and making the transition to the predetermined master plurality avoidance process without making the transition to the operation state when it is determined that plural communication master stations exist by the master plurality determination process performed in parallel with the link establishment process, wherein, in the master plurality determination process performed in advance of the link establishment process, the master plurality is determined based on a fact that a frame is received during a monitoring period longer than a broadcast period of the polling frame in the operation state.

6. A PLC system in which one PLC device having a communication facility and one or more I/O terminal devices having the communication facilities are connected with a bus type network, the PLC device having the communication facility is set to a communication master station while each of the I/O terminal devices having the communication facilities is set to a communication slave station, and, in an operation state, the corresponding communication slave station repeats a series of operations where a response frame is returned to the communication master station for frame transmission from the communication master station and thereby various pieces of data are exchanged between the communication master station and each communication slave station, wherein the communication master station comprising:

a master plurality determination part which detects existence of plural communication master stations on the network is performed in advance of a link establishment process and/or in parallel with the link establishment process in a procedure of making transition to the operation state through the link establishment process after startup;

a first master plurality avoidance part which makes a transition to a predetermined master plurality avoidance process without making the transition to the link establishment process when it is determined that plural communication master stations exist by the master plurality determination process performed in advance of the link establishment process; and a second master plurality avoidance part which makes the transition to the predetermined master plurality avoidance process without making the transition to the operation state when it is determined that plural communication master stations exist by the master plurality determination process performed in parallel with the link establishment process, wherein, in the master plurality determination process performed in advance of the link establishment process, the master plurality is determined based on a fact that a frame is received during a monitoring period longer than a broadcast period of the polling frame in the operation state.

* * * * *